(12) United States Patent
Yoda (10) Patent No.: US 9,690,249 B2
(45) Date of Patent: Jun. 27, 2017

(54) IMAGE FORMING APPARATUS THAT SUPPRESSES LEVEL OF UNWANTED IRRADIATION

(71) Applicant: Kyocera Document Solutions Inc., Osaka (JP)

(72) Inventor: Junya Yoda, Osaka (JP)

(73) Assignee: Kyocera Document Solutions Inc., Osaka (JP)

(*) Notice: Subject to any disclaimer, the term of this patent is extended or adjusted under 35 U.S.C. 154(b) by 0 days.

(21) Appl. No.: 15/197,805

(22) Filed: Jun. 30, 2016

(65) Prior Publication Data

US 2017/0003642 A1    Jan. 5, 2017

(30) Foreign Application Priority Data

Jun. 30, 2015 (JP) ................. 2015-130792

(51) Int. Cl.
| | |
|---|---|
| *G03G 21/16* | (2006.01) |
| *G03G 15/00* | (2006.01) |
| *H04N 1/00* | (2006.01) |
| *H04N 1/50* | (2006.01) |
| *G06K 7/10* | (2006.01) |
| *G03G 15/08* | (2006.01) |
| *G03G 21/18* | (2006.01) |

(52) U.S. Cl.
CPC ......... *G03G 15/80* (2013.01); *G03G 15/0863* (2013.01); *G03G 21/1657* (2013.01); *G06K 7/10316* (2013.01); *G06K 7/10366* (2013.01); *H04N 1/00302* (2013.01); *H04N 1/00411* (2013.01); *H04N 1/50* (2013.01); *G03G 21/1882* (2013.01); *H04N 2201/0094* (2013.01)

(58) Field of Classification Search
CPC ...... G03G 15/80; G03G 21/1657; H04N 1/50; G06K 7/10366
See application file for complete search history.

(56) References Cited

U.S. PATENT DOCUMENTS

2002/0015597 A1* 2/2002 Okada ................ G03G 15/0896
 399/27
2004/0228639 A1* 11/2004 Badovinac ......... G03G 15/5079
 399/8

(Continued)

FOREIGN PATENT DOCUMENTS

JP 2010-054928 3/2010

*Primary Examiner* — G. M. Hyder
(74) *Attorney, Agent, or Firm* — James Judge (57) ABSTRACT

An image forming apparatus includes an image forming apparatus body and a unit. The unit is installed on the image forming apparatus body and includes a wireless tag. The image forming apparatus body includes a first power supply unit, a setting unit, a second power supply unit, a generating unit, and a communication unit. The second power supply unit generates a second value of voltage set in the setting unit. The generating unit uses the first power supply unit as a power source and generates a first signal for transmission to the wireless tag. The communication unit uses the second power supply unit as a power source, generates a second signal having amplitude in proportion to the second value set in the setting unit based on the first signal, and transmits the second signal to the wireless tag by wireless.

5 Claims, 6 Drawing Sheets

(56) References Cited

U.S. PATENT DOCUMENTS

| | | | | |
|---|---|---|---|---|
| 2006/0273904 A1* | 12/2006 | Funo | ............ | G03G 15/50 340/572.1 |
| 2007/0183794 A1* | 8/2007 | Okada | ............ | G03G 15/0855 399/12 |
| 2010/0117801 A1* | 5/2010 | Okada | ............ | G03G 15/0855 340/10.1 |

* cited by examiner

IMAGE FORMING APPARATUS THAT SUPPRESSES LEVEL OF UNWANTED IRRADIATION

INCORPORATION BY REFERENCE

This application is based upon, and claims the benefit of priority from, corresponding Japanese Patent Application No. 2015-130792 filed in the Japan Patent Office on Jun. 30, 2015, the entire contents of which are incorporated herein by reference.

BACKGROUND

Unless otherwise indicated herein, the description in this section is not prior art to the claims in this application and is not admitted to be prior art by inclusion in this section.

A typical image forming apparatus includes a unit removably attached with respect to an image forming apparatus body. An example of such a unit includes a toner container. If toner inside the toner container is all consumed, the toner container is removed from the image forming apparatus body, and a new toner container is installed in the image forming apparatus body to use the image forming apparatus.

In order to control the remaining amount of toner inside the toner container, a wireless tag may be attached to the toner container.

SUMMARY

An image forming apparatus according to one aspect of the disclosure includes an image forming apparatus body and a unit. The unit is installed on the image forming apparatus body and includes a wireless tag. The image forming apparatus body includes a first power supply unit, a setting unit, a second power supply unit, a generating unit, and a communication unit. The first power supply unit generates a fixed first value of voltage. The setting unit sets a second value and ensures varying the second value. The second power supply unit generates the second value of voltage set in the setting unit. The generating unit uses the first power supply unit as a power source and generates a first signal for transmission to the wireless tag. The communication unit uses the second power supply unit as a power source, generates a second signal having amplitude in proportion to the second value set in the setting unit based on the first signal, and transmits the second signal to the wireless tag by wireless.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Figure 1:
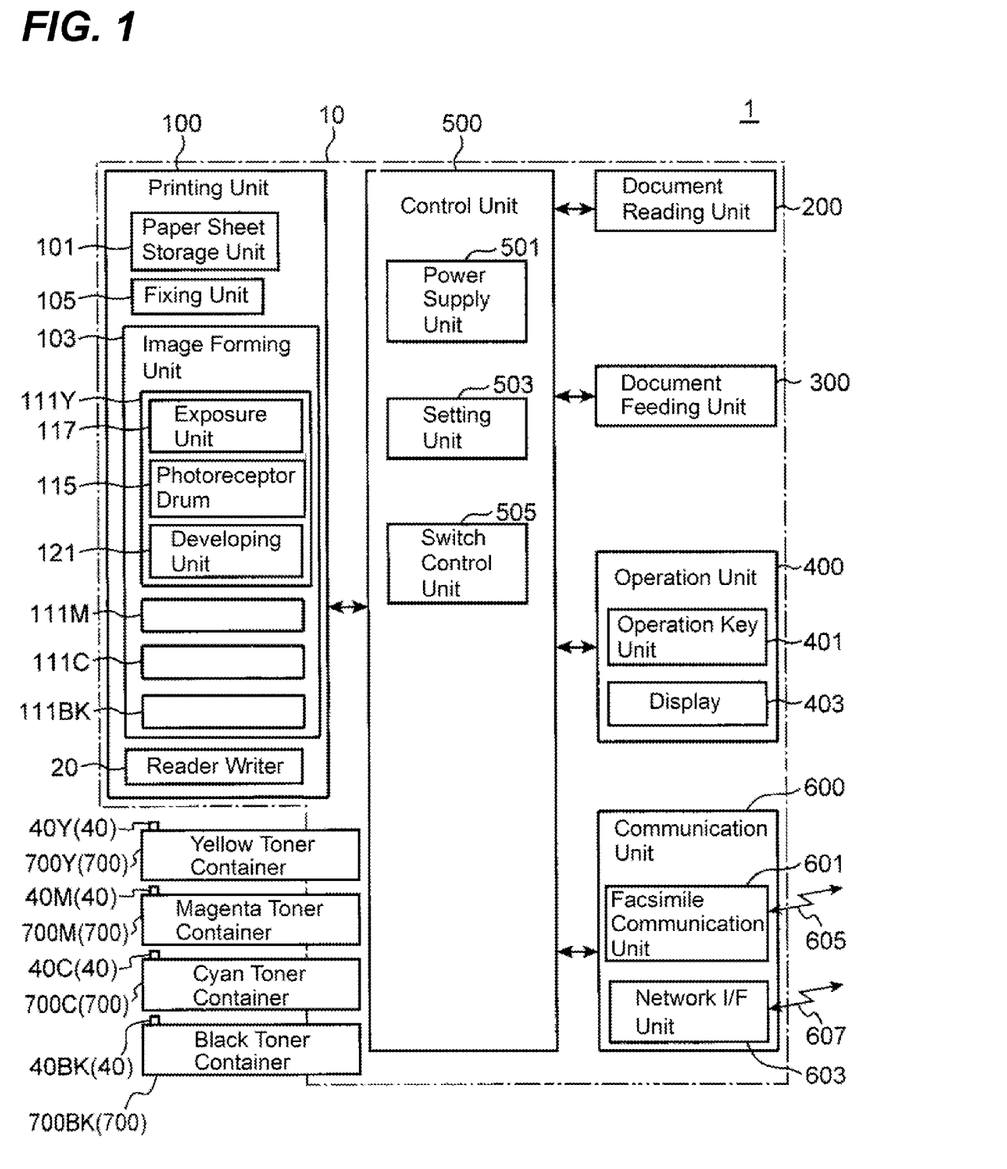
FIG. 1 illustrates a configuration of an image forming apparatus according to one embodiment of the disclosure.

Hereinafter, an embodiment of the disclosure will be described in detail based on the drawings. FIG. 1 illustrates a configuration of an image forming apparatus 1 according to the embodiment. A description will be given in an example that a digital multi-functional peripheral has functions of a copier, a printer, a scanner, and a facsimile as the image forming apparatus 1. The image forming apparatus 1 may be any device insofar as the device has a function to print images, and is not limited to the digital multi-functional peripheral. For example, a printer may be used as the image forming apparatus 1. The image forming apparatus 1 includes a printing unit 100, a document reading unit 200, a document feeding unit 300, an operation unit 400, a control unit 500, a communication unit 600, and four toner containers 700.

When one original document is placed on a document platen, which is located in the document feeding unit 300, the document feeding unit 300 transfers the original document to the document reading unit 200. When a plurality of original documents are placed on the document platen, the document feeding unit 300 continuously transfers the plurality of original documents to the document reading unit 200.

The document reading unit 200 reads the original document, which is placed on the platen or the original document fed from the document feeding unit 300, and outputs image data of the original document.

The printing unit 100 includes a paper sheet storage unit 101, an image forming unit 103, and a fixing unit 105. The paper sheet storage unit 101 can accumulate a bundle of papers. For the accumulated bundle of papers, the top paper sheet is delivered to a paper sheet conveyance passage (not illustrated) by the driving of a pickup roller (not illustrated). The paper sheet is conveyed to the image forming unit 103 through the paper sheet conveyance passage.

The image forming unit 103 forms toner images on the conveyed paper sheet. The image forming unit 103 includes a yellow image forming unit 111Y, a magenta image forming unit 111M, a cyan image forming unit 111C, and a black image forming unit 111BK, which are located in accordance with the order in which the toner images are transferred. These units have similar configurations and a description will be given taking the yellow image forming unit 111Y as an example.

The yellow image forming unit 111Y includes a photoreceptor drum 115, an exposure unit 117, and a developing unit 121. The exposure unit 117 generates a light modulated corresponding to the image data (such as the image data output from the document reading unit 200, the image data transmitted from a personal computer, and the image data of facsimile reception), and irradiates the circumference surface of the photoreceptor drum 115, which is evenly electrostatic-charged with the light. This forms an electrostatic latent image corresponding to the yellow image data on the circumference surface of the photoreceptor drum 115. Supplying a yellow toner on the circumference surface of the photoreceptor drum 115 from the developing unit 121 in this state forms a toner image corresponding to the yellow image data on the circumference surface.

A yellow toner image formed by the yellow image forming unit 111Y, a magenta toner image formed by the magenta image forming unit 111M, a cyan toner image formed by the cyan image forming unit 111C, and a black toner image formed by the black image forming unit 111BK are superimposed on a transfer belt (not illustrated), thus forming a color toner image. The color toner image is transferred on a paper sheet conveyed from the above-described paper sheet storage unit 101.

The paper sheet on which the color toner image is transferred is sent to the fixing unit 105. The fixing unit 105 applies heat and pressure to the color toner image and the paper sheet to fix the color toner image on the paper sheet. The paper sheet is discharged to a sheet discharge tray (not illustrated).

Above the yellow image forming unit 111Y, the magenta image forming unit 111M, the cyan image forming unit 111C, and the black image forming unit 111BK, there are toner containers 700 housing color toners corresponding to the respective colors: that is, a yellow toner container 700Y, a magenta toner container 700M, a cyan toner container 700C, and a black toner container 700BK are located. The developing units 121 of the respective colors are replenished with toners from the corresponding toner containers 700 of the respective colors.

The printing unit 100, the document reading unit 200, the document feeding unit 300, the operation unit 400, the control unit 500, and the communication unit 600 constitute an image forming apparatus body 10. The image forming apparatus body 10 may have any configuration insofar as the configuration includes the printing unit 100 and the control unit 500, and the other components may also be unitized.

The yellow toner container 700Y, the magenta toner container 700M, the cyan toner container 700C, and the black toner container 700BK are concrete examples of units installed on the image forming apparatus body 10. When it is not necessary to distinguish these toner containers, they are referred to as a toner container 700.

The toner container 700 is removably attached on the image forming apparatus body 10. When a toner inside the toner container 700 has been used up, the toner container 700 is removed from the image forming apparatus body 10, and a new toner container 700 is installed in the image forming apparatus body 10.

On the yellow toner container 700Y, a wireless tag 40Y is installed. On the magenta toner container 700M, a wireless tag 40M is installed. On the cyan toner container 700C, a wireless tag 40C is installed. On the black toner container 700BK, a wireless tag 40BK is installed. When it is not necessary to distinguish these wireless tags, they are referred to as a wireless tag 40. The wireless tag 40 is also referred to such as a radio frequency (RF) tag, and an IC tag.

A reader writer 20, on which an antenna used for wireless communication with the wireless tag 40 is located, is located in the printing unit 100.

The operation unit 400 includes an operation key unit 401 and a display 403. The display 403 has a touch panel function and displays a screen including a software key. A user, for example, makes settings required to execute such as a copying function by operating the software key while looking at the screen.

The operation key unit 401 includes an operation key with a hardware key. The operation key is a function switching key to switch among, for example, a start key, a numeric keypad, a reset key, a copy, a printer, a scanner, and a facsimile.

The control unit 500 includes such as a CPU, a ROM, and a RAM. The CPU executes controls required to cause the image forming apparatus 1 to operate with respect to the above-described components (such as the printing unit 100) of the image forming apparatus 1. The ROM stores software required to control operations of the image forming apparatus 1. The RAM is available for such as a temporal storage of data generated when the software is executed, and storage of application software.

The control unit 500 includes a power supply unit 501, a setting unit 503, and a switch control unit 505 as function blocks. These function blocks will be described in detail later.

The communication unit 600 includes a facsimile communication unit 601 and a network I/F unit 603. The facsimile communication unit 601 includes a network control unit (NCU), which controls a telephone line connection to a destination facsimile apparatus, and a signal modulation and demodulation circuit, which modulates and demodulates a signal for facsimile communication. The facsimile communication unit 601 is connected to a telephone line 605.

The network I/F unit 603 is connected to a local area network (LAN) 607. The network I/F unit 603 is a communication interface circuit for executing communication with a personal computer connected to the LAN 607.

Figure 2:
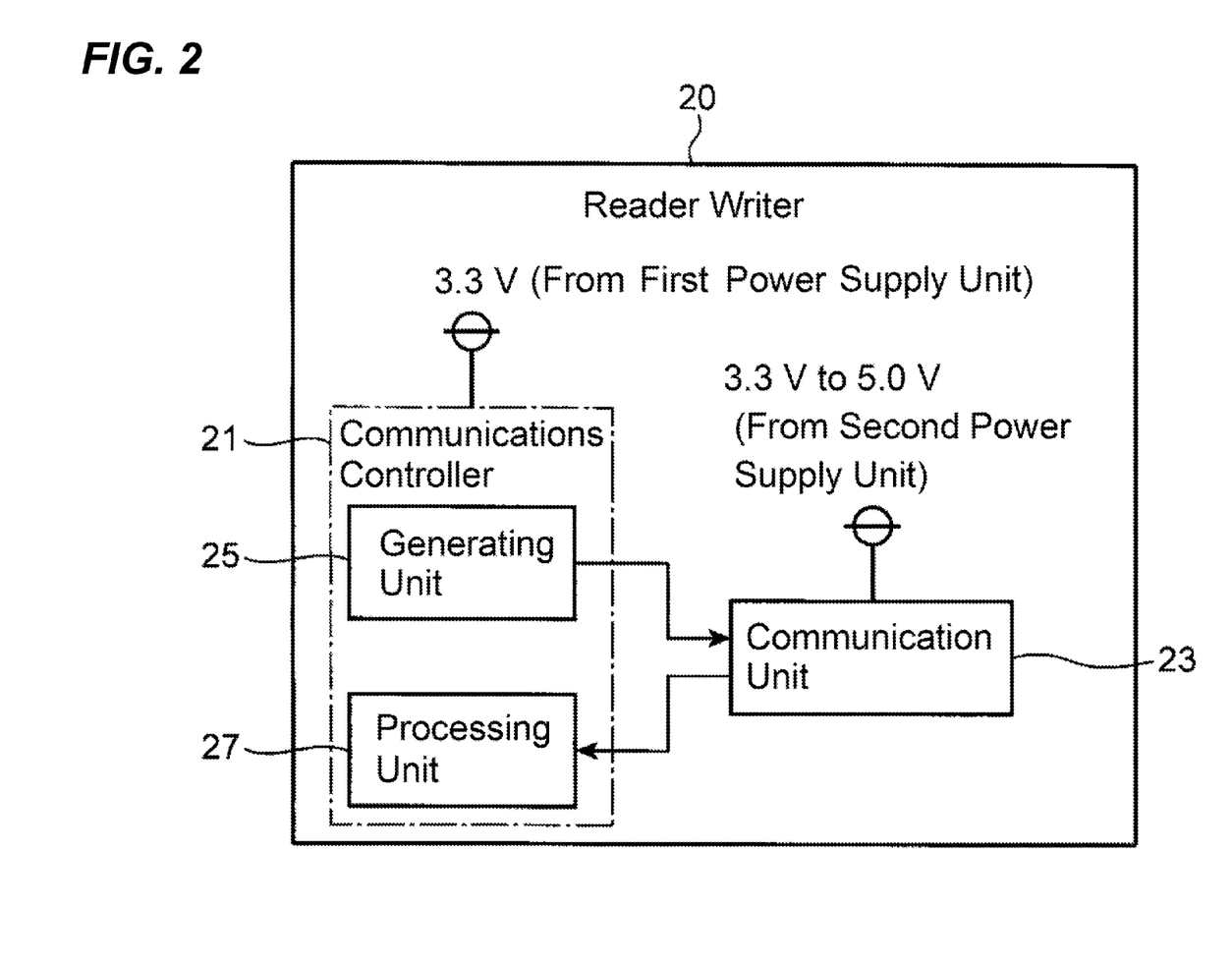
FIG. 2 illustrates a functional configuration of a reader writer according to the one embodiment.

FIG. 2 illustrates a functional configuration of the reader writer 20. The reader writer 20 includes a communications controller 21 and a communication unit 23.

The communications controller 21 performs various kinds of controls to cause the communication unit 23 to perform wireless communication with the wireless tag 40. The communications controller 21 has functions of a generating unit 25 and a processing unit 27.

The generating unit 25 generates a first signal, which is transmitted to the wireless tag 40 illustrated in FIG. 1. The first signal is a digital signal and is also, for example, a control signal for establishing communication with the wireless tag 40, an instruction signal for reading out data stored in the wireless tag 40, or an instruction signal for writing data to the wireless tag 40.

The processing unit 27 performs a predetermined process based on a third signal transmitted from the communication unit 23. The third signal is a signal taken out by detecting a signal that is received by the communication unit 23 and transmitted by wireless from the wireless tag 40. An example of the predetermined process includes a process for analyzing the third signal and causing the generating unit 25 to generate a signal for responding to the wireless tag 40.

The communication unit 23 generates a modulation wave based on the first signal, which is generated by the generating unit 25, transmits the modulation wave to the wireless tag 40 by wireless, receives a signal transmitted from the wireless tag 40 by wireless, and detects the received signal.

Figure 3:
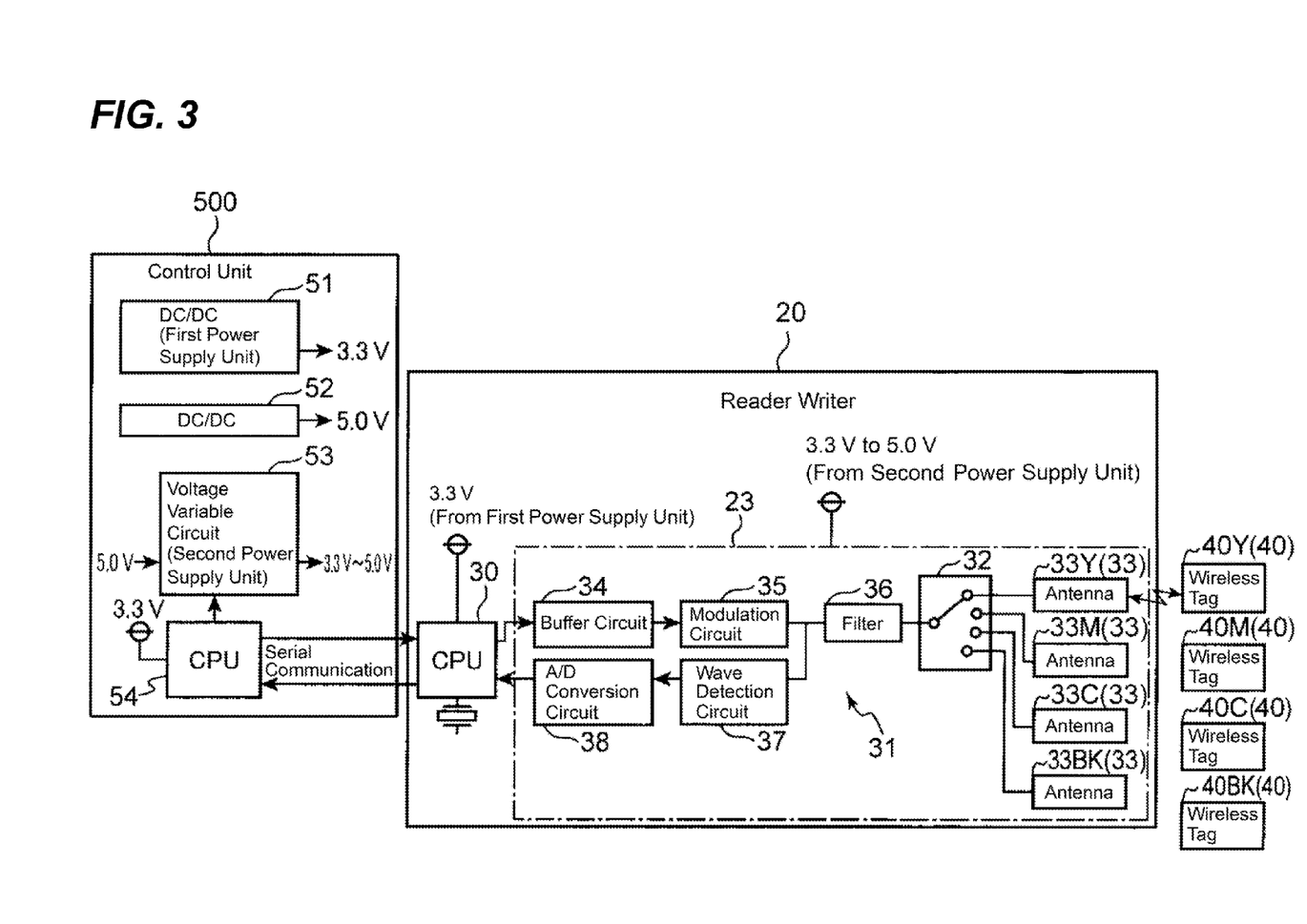
FIG. 3 illustrates a control unit and a physical configuration of a reader writer according to the one embodiment.

FIG. 3 illustrates a physical configuration of the control unit 500 and the reader writer 20. The control unit 500 includes a DC/DC converter 51, a DC/DC converter 52, a voltage variable circuit 53, and a CPU 54.

The DC/DC converter 51, the DC/DC converter 52, and the voltage variable circuit 53 achieve the power supply unit 501 illustrated in FIG. 1. The CPU 54 achieves the setting unit 503 and the switch control unit 505 illustrated in FIG. 1 in combination with a RAM (not illustrated) and a ROM (not illustrated), which are included in the control unit 500. The CPU 54 has the DC/DC converter 51 as a power source.

The DC/DC converter 51 generates and outputs a direct current of 3.3 V. The DC/DC converter 52 generates and outputs a direct current of 5.0 V. The voltage variable circuit 53 converts the direct current of 5.0 V, which is output from the DC/DC converter 52, into a direct current of a second value voltage set in the setting unit 503 illustrated in FIG. 1. The setting unit 503 can set and vary the setting of the second value. A description will be given in an example that the second value, which can be set in the setting unit 503, is in a range of 3.3 V to 5.0 V. When the second value is set to 4.0 V in the setting unit 503, for example, the voltage variable circuit 53 generates a direct current of 4.0 V.

The DC/DC converter 51 is a concrete example of a first power supply unit, which generates voltage of a fixed first value (here, 3.3 V). The communications controller 21, generating unit 25, and the processing unit 27 illustrated in FIG. 2 have the DC/DC converter 51 as a power source.

The voltage variable circuit 53 is a concrete example of a second power supply unit which generates the second value voltage set in the setting unit 503. The communication unit 23 has the voltage variable circuit 53 as a power source.

The reader writer 20 includes a CPU 30 and the communication unit 23.

The CPU 30 achieves the communications controller 21, the generating unit 25, and the processing unit 27 illustrated in FIG. 2 in combination with a RAM (not illustrated) and a ROM (not illustrated) mounted in the reader writer 20. The CPU 30 has the DC/DC converter 51 as a power source. The value of voltage, which the DC/DC converter 51 supplies to the CPU 30, is fixed to 3.3 V (a first value voltage).

The communication unit 23 includes a communication unit body 31, a switching unit 32, and four antennas 33.

The communication unit body 31 generates a second signal as a modulation wave, based on the first signal generated by the generating unit 25 (CPU 30) illustrated in FIG. 2. The communication unit body 31 detects the signal, which is transmitted from the wireless tag 40 by wireless and is received by the antenna 33, and generates the third signal.

The four antennas 33 are located corresponding to the wireless tags 40, which are included in the respective four toner containers 700 illustrated in FIG. 1, and transmit the second signal, which is generated by the communication unit body 31, to the wireless tags 40 by wireless, and receive the signal transmitted from the wireless tag 40 by wireless.

An antenna 33Y transmits and receives a wireless signal to/from the wireless tag 40Y attached to the yellow toner container 700Y. An antenna 33M transmits and receives a wireless signal to/from the wireless tag 40M attached to the magenta toner container 700M. An antenna 33C transmits and receives a wireless signal to/from the wireless tag 40C attached to the cyan toner container 700C. An antenna 33BK transmits and receives a wireless signal to/from the wireless tag 40BK attached to the black toner container 700BK. When it is not necessary to distinguish these antennas, they are referred to as an antenna 33.

The switching unit 32 is an analog switch and can switch the antenna 33 that connects to the communication unit body 31 among the four antennas 33. This can choose the antenna 33 that connects to the communication unit body 31. The switch control unit 505 illustrated in FIG. 1 transfers a control signal to the switching unit 32, and the switching unit 32 switches the antenna 33 for connecting to the communication unit body 31 corresponding to the control signal.

According to the embodiment, among the four antennas 33, which are located corresponding to the wireless tags 40 included in the respective four toner containers 700, the antennas 33 for connecting to the communication unit body 31 is switched in order to cause the communication unit 23 to communicate with the wireless tags 40. Therefore, the number of the communication unit bodies 31 can be reduced to one.

A description will be given of the communication unit body 31 in detail. The communication unit body 31 includes a buffer circuit 34, a modulation circuit 35, a filter 36, a wave detection circuit 37, and an A/D conversion circuit 38. Since the setting of the second value (3.3 V to 5.0 V) can be varied, the first value (3.3 V) may be different from the second value. In view of this, the voltage should be level-shifted. In this embodiment, as is described below, the voltage is level-shifted by the buffer circuit 34 and the A/D conversion circuit 38.

Figure 4:
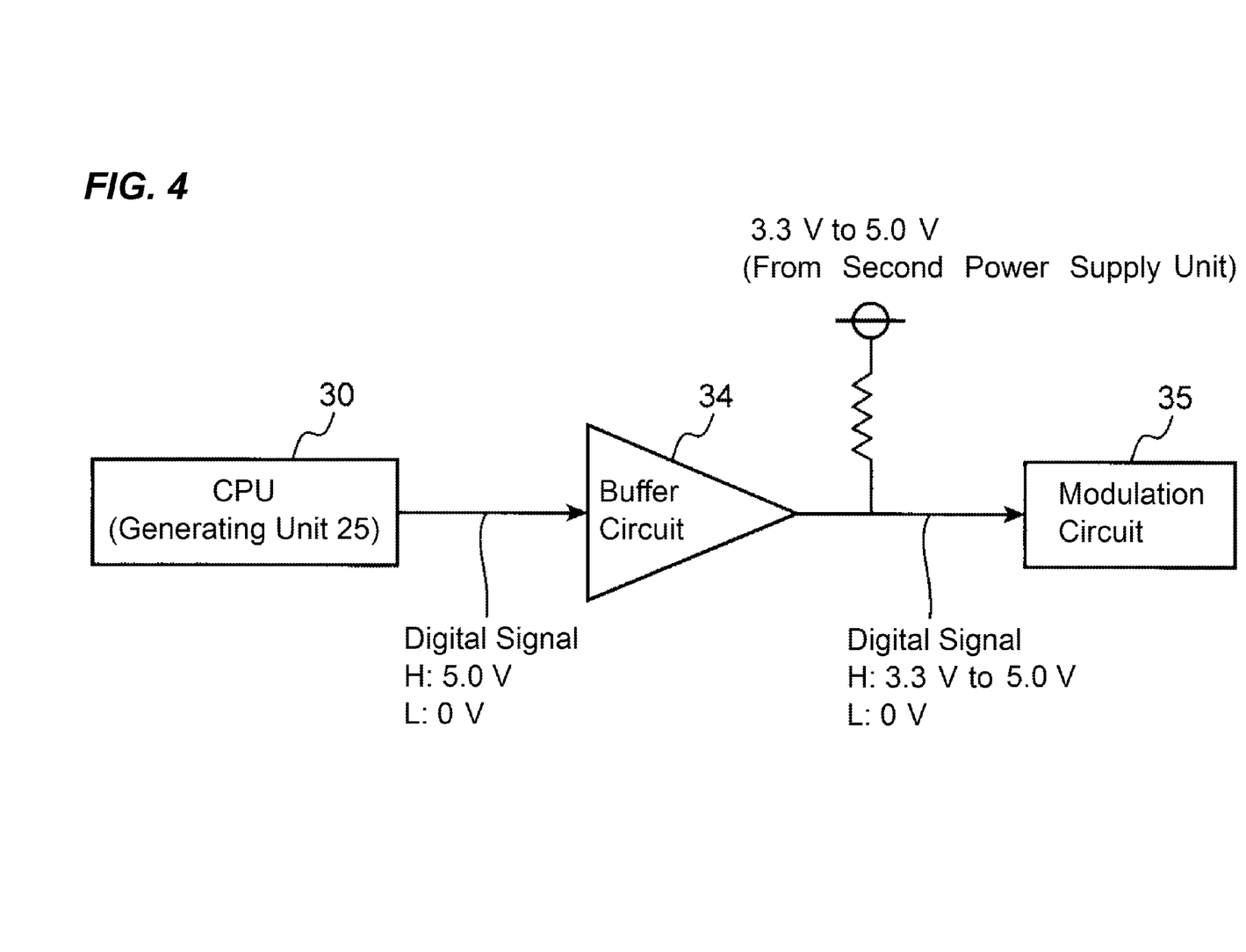
FIG. 4 illustrates a configuration near a buffer circuit according to the one embodiment.

The buffer circuit 34 is a concrete example of a buffer unit, and buffers the digital first signal, which is generated in the CPU 30 (the generating unit 25 in FIG. 2). FIG. 4 illustrates a configuration near the buffer circuit 34. The buffer circuit 34 has an open-collector output pulled up by the second value voltage (3.3 V to 5.0 V), which is supplied by the voltage variable circuit 53 (the second power supply unit) illustrated in FIG. 3. This shifts an H-level component of the first signal from the first value (3.3 V) to the second value (3.3 V to 5.0 V).

Thus, the buffer circuit 34 has a function to level-shift from the voltage of the first power supply unit to the voltage of the second power supply unit. Accordingly, this embodiment can realize the level-shift of the voltage value using the buffer circuit 34, without additionally locating a circuit for level-shifting the voltage value.

Referring to FIG. 3, the modulation circuit 35 is a concrete example of a modulation unit, and modulates a carrier wave by the first signal output from the buffer circuit 34 to generate the second signal.

The filter 36 removes noise from the second signal. The second signal noise of which is removed is discharged as a wireless signal by the antenna 33 connected to the filter 36 (that is, the signal is transmitted to the wireless tag 40 by wireless).

The power source of the communication unit 23 is the voltage variable circuit 53 (the second power supply unit). Therefore, the communication unit 23 generates the second signal, which has amplitude in proportion to the second value set in the setting unit 503 in FIG. 1, based on the first signal generated by the generating unit 25 in FIG. 2, and transmits the second signal to the wireless tag 40 by wireless.

The signal transmitted from the wireless tag 40 by wireless is received by the antenna 33, and the noise of the received signal (the modulation wave) is removed by the filter 36. The wave detection circuit 37 extracts an analog third signal from the signal the noise of which is removed.

The A/D conversion circuit 38 is a concrete example of an A/D converter, and converts the third signal from analog to digital. The third signal, which is converted into digital, is transmitted to the CPU 30 (the processing unit 27 illustrated in FIG. 2).

Figure 5:
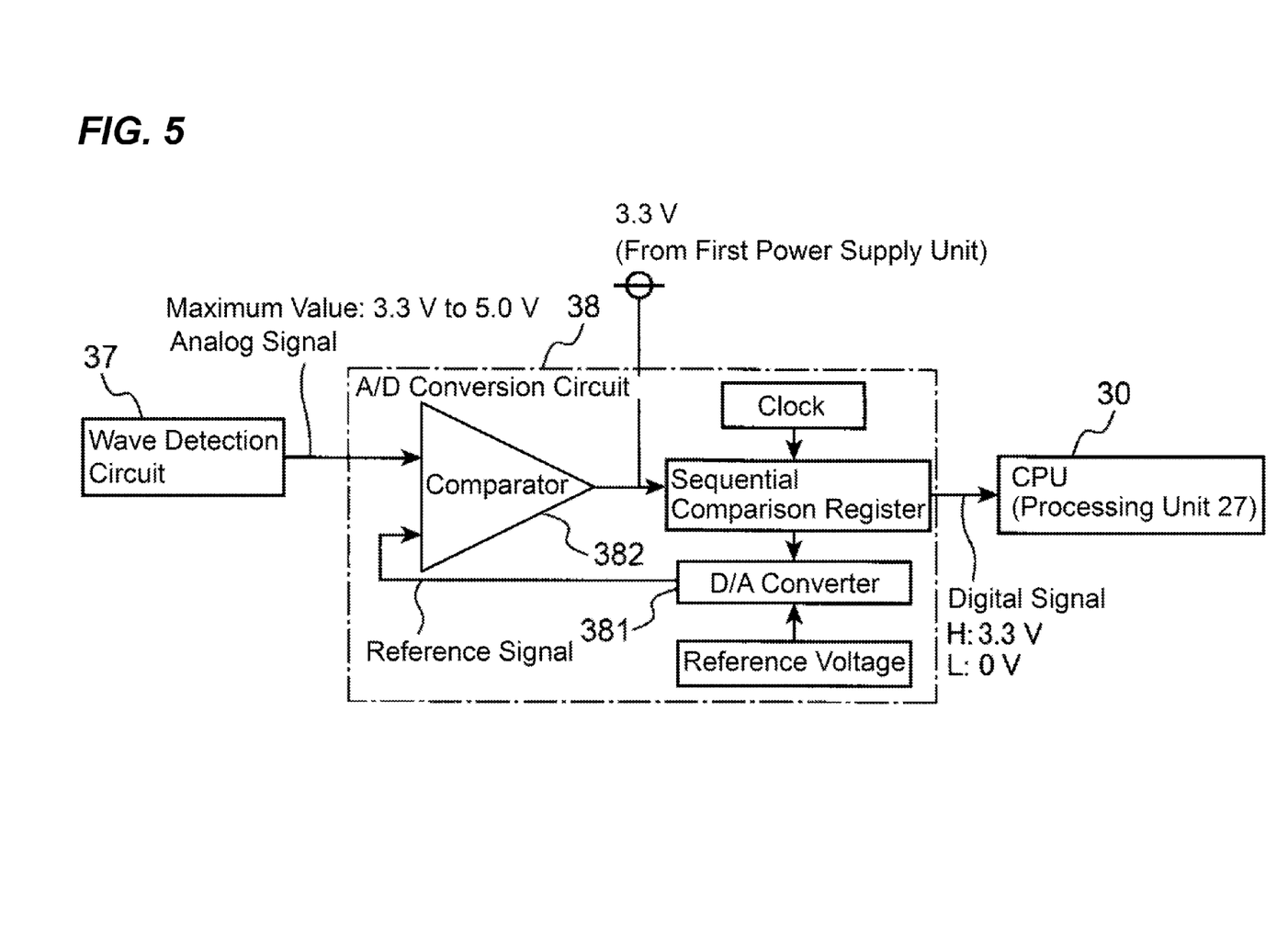
FIG. 5 illustrates a configuration of an A/D conversion circuit according to the one embodiment.

FIG. 5 illustrates a configuration of the A/D conversion circuit 38. The type of the A/D conversion circuit 38 is the sequential comparison type. The A/D conversion circuit 38 includes a comparator 382, which compares the analog third signal output from the wave detection circuit 37 with a reference signal output from a D/A converter 381.

The comparator 382 has an open-collector output, which is pulled-up by the first value (3.3 V) voltage supplied from the DC/DC converter 51 (the first power supply unit). This shifts the H-level component value of the digital third signal to the first value (3.3 V).

Thus, the A/D conversion circuit 38 has a function to level-shift the voltage from the voltage of the second power supply unit to the voltage of the first power supply unit. This embodiment ensures the level-shift of the voltage value using the A/D conversion circuit 38, without additionally locating a circuit for level-shifting the voltage value.

Referring to FIG. 3, the third signal, which is converted into digital by the A/D conversion circuit 38, is transmitted to the CPU 30 (the processing unit 27 illustrated in FIG. 2). The processing unit 27, as described above, performs the predetermined process based on the digital third signal.

If the amplitude of the second signal transmitted to the wireless tag 40 is increased, the level of unwanted irradiation generated from the communication unit 23 is increased, and if the amplitude of the second signal is decreased, the level of unwanted irradiation is deceased. If the amplitude of the second signal is decreased excessively, it becomes impossible for the communication unit 23 to communicate with the wireless tag 40.

The power source of the communication unit 23 is the voltage variable circuit 53, which generates the second value voltage set in advance. The communication unit 23 generates the second signal, which has the amplitude in proportion to the second value. Since the setting unit 503 illustrated in FIG. 1 can vary the setting of the second value, the amplitude of the second signal can be adjusted by adjusting the second value. Accordingly, this embodiment can limit the amplitude of the second signal to a minimum required for communication between the communication unit 23 and the wireless tag 40, so as to reduce the level of unwanted irradiation generated during the communication with the wireless tag 40. This can reduce an electro-magnetic interference (EMI) without mounting a wave shield which inhibits communication of the reader writer 20.

Proportion means that increase in the second value accordingly increases the amplitude of the second signal, and that decrease in the second value accordingly decreases the amplitude of the second signal.

The generating unit 25 illustrated in FIG. 2 generates the first signal, which is a source of the second signal transmitted to the wireless tag 40. The generating unit 25 includes such as the CPU 30 illustrated in FIG. 3. Since the CPU 30 operates at a predetermined value of the voltage, changing the setting value of the voltage supplied to the CPU 30 will cause malfunction of the CPU 30. Therefore, this embodiment fixes the value (the first value) of the voltage generated by the DC/DC converter 51 (the first power supply unit), which is the power source of the generating unit 25.

Figure 6:
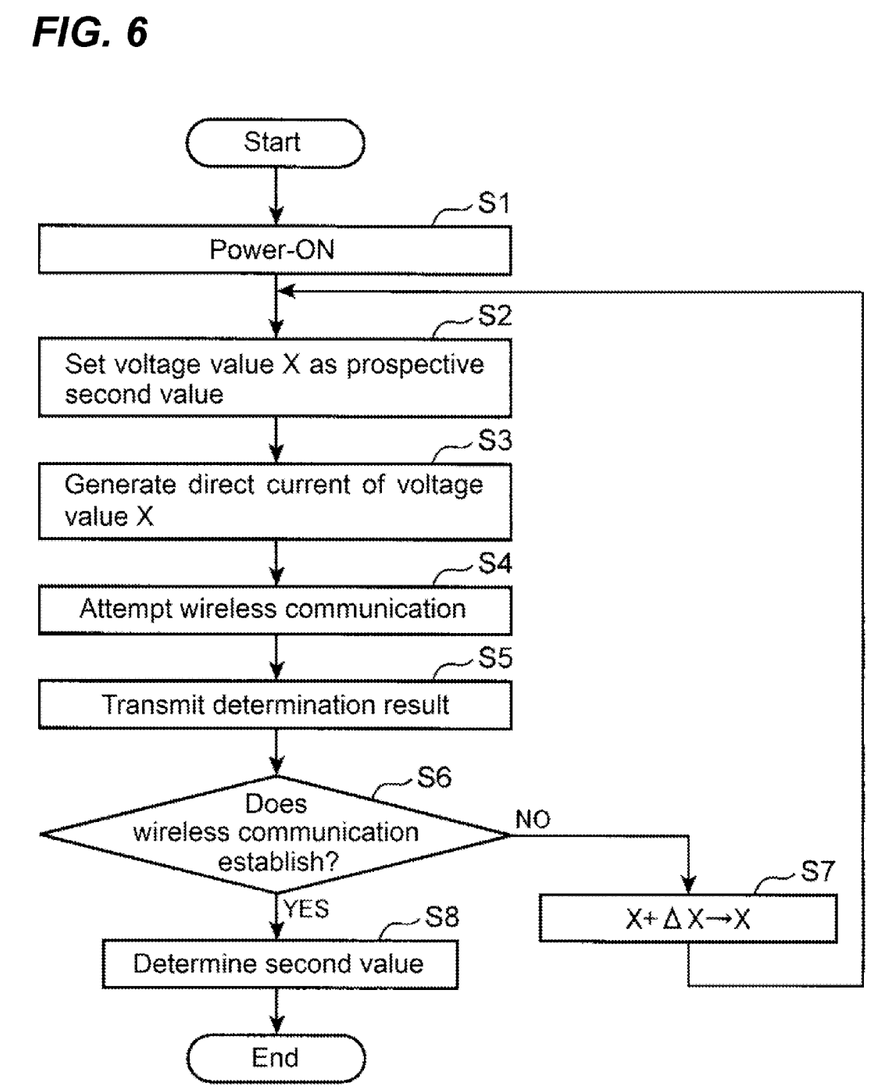
FIG. 6 illustrates an automatic setting of a second value according to the one embodiment.

Next, a description will be given of an automatic setting of the second value. FIG. 6 describes the automatic setting. The image forming apparatus 1 is turned on (Step S1). The control unit 500 illustrated in FIG. 3 starts the DC/DC converter 51, the DC/DC converter 52, and the voltage variable circuit 53. The start of the DC/DC converter 51 generates the direct current of 3.3 V. The start of the DC/DC converter 52 generates the direct current of 5.0 V.

The setting unit 503 in FIG. 1 sets a voltage value X which is a prospective second value (Step S2). Here, 3.3 V, as a minimum voltage, which the voltage variable circuit 53 can generate, is set as the voltage value X.

The setting unit 503 controls the voltage variable circuit 53 and causes the voltage variable circuit 53 to generate the direct current of the voltage value X, which is set in Step S2 (Step S3).

The switch control unit 505 in FIG. 1 controls the switching unit 32 in FIG. 3 to connect the antenna 33Y to the filter 36.

The communications controller 21 in FIG. 2 causes the communication unit 23 to attempt wireless communication with the wireless tag 40Y (Step S4).

The communications controller 21 determines whether or not wireless communication is established between the wireless tag 40Y and the communication unit 23, and transmits a determination result to the control unit 500 by serial communication (Step S5).

If the determination result indicates communication failure (Step S6: No), the setting unit 503 sets a value, which is obtained by adding a predetermined value ΔX to the voltage value X set in Step S2, as a new voltage value X (Step S7). Assume that the predetermined value is 0.1 V, for example. The setting unit 503 sets the voltage value X of Step S7 (Step S2). Here, the voltage value X is set to 3.4 V. Then, the process proceeds to Step S3.

If the above-described determination result indicates communication establishment (Step S6: Yes), the setting unit 503 determines the voltage value X, which is set in Step S2 most recently, as the second value (Step S8). The setting unit 503 sets the second value, which is determined in Step S8, as the voltage value of the direct current generated by the voltage variable circuit 53 (the second power supply unit) when the communication unit 23 performs wireless communication with the wireless tags 40Y, 40M, 40C, and 40BK illustrated in FIG. 3.

As described above, while increasing the voltage value X by little and little (while varying the prospective second value), the setting unit 503 causes the communications controller 21 to determine whether or not wireless communication between the communication unit 23 and the wireless tag 40Y is established, and sets a minimum value of the voltage value X, at which wireless communication is established, as the second value. This enables to automatically set the second value to the minimum value required for wireless communication between the communication unit 23 and the wireless tag 40.

In this embodiment, the second value is automatically set using the wireless tag 40Y as a representative. When each of the wireless tags 40Y, 40M, 40C, and 40BK may have a different second value, the automatic setting of the second value may be performed on each of the wireless tags 40Y, 40M, 40C, and 40BK. In this case, upon completion of setting of the second value for wireless communication between the communication unit 23 and the wireless tag 40Y, the switch control unit 505 controls the switching unit 32 to connect the filter 36 to the antenna 33M. Then, as described above, the setting unit 503 sets the second value for wireless communication between the communication unit 23 and the wireless tag 40M, and the switch control unit 505 controls the switching unit 32 to connect the filter 36 to the antenna 33C. Then, as described above, the setting unit 503 sets the second value for wireless communication between the communication unit 23 and the wireless tag 40C, and lastly, the switch control unit 505 controls the switching unit 32 to connect the filter 36 to the antenna 33BK. Then, as described above, the setting unit 503 sets the second value for wireless communication between the communication unit 23 and the wireless tag 40BK.

In this embodiment, each time the image forming apparatus 1 is turned on, the second value is automatically set in the setting unit 503, but this is not limitative. For example, when the image forming apparatus 1 is first turned on, the second value is automatically set in the setting unit 503, and thereafter the second value may be fixed to this automatically-set value. The setting of the second value may be conducted by operating the operation unit 400 in FIG. 1, instructing the automatic setting of the second value, and causing the setting unit 503 to set the second value automatically. Furthermore, a serviceman or a user may operate the operation unit 400 in order to input the second value and causes the setting unit 503 to set to the input second value.

In this embodiment, although the description is made by using the four toner containers 700 in FIG. 1 for color printing, the disclosure can be applied to monochrome printing. In this case, the switch control unit 505 in FIG. 1 as well as the switching unit 32 and the antennas 33Y, 33M, 33C in FIG. 3 are not necessary, and it is only necessary to locate the antenna 33BK corresponding to the wireless tag 40BK attached to the black toner container 700BK.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:
1. An image forming apparatus, comprising:
an image forming apparatus body; and
a unit installed on the image forming apparatus body and including a wireless tag; wherein
the image forming apparatus body includes
a first power supply unit that generates a fixed first value of voltage,
a setting unit that sets a second value and ensures varying the second value,
a second power supply unit that generates the second value of voltage set in the setting unit,
a generating unit that uses the first power supply unit as a power source and generates a first signal for transmission to the wireless tag, and
a communication unit that uses the second power supply unit as a power source, generates a second signal having amplitude in proportion to the second value set in the setting unit based on the first signal, and transmits the second signal to the wireless tag by wireless.

2. The image forming apparatus according to claim 1, wherein the communication unit includes:
a buffer unit that buffers the first signal in digital form; and
a modulation unit that modulates a carrier wave by the first signal output from the buffer unit to generate the second signal; wherein
the buffer unit has an open-collector output pulled-up by the second value of voltage supplied from the second power supply unit to shift an H-level component value of the first signal to the second value.

3. The image forming apparatus according to claim 1, wherein the communication unit further includes:
a wave detection unit that extracts an analog third signal from a signal transmitted from the wireless tag by wireless and received by the communication unit; and
an A/D conversion unit that converts the third signal from analog to digital; wherein
the A/D conversion unit includes a comparator that compares the analog third signal with a reference signal,
the comparator has an open-collector output pulled-up by the first value of voltage supplied from the first power supply unit to shift a H-level component of the third signal for conversion into digital form, to the first value, and
the image forming apparatus body uses the first power supply unit as a power source and includes a processing unit that performs a predetermined process based on the third signal converted into digital form by the A/D conversion unit.

4. The image forming apparatus according to claim 1, wherein:
the image forming apparatus body further includes a communications control unit that causes the communication unit to attempt wireless communication with the wireless tag, and determines whether or not wireless communication is established; and
the setting unit causes the communications control unit to determine whether or not the wireless communication is established while varying a prospective value of the second value, and sets a minimum value of the second value at which the wireless communication is established as the second value.

5. The image forming apparatus according to claim 1, wherein:
the image forming apparatus further comprises a plurality of toner containers as a plurality of the units; and
the communication unit includes
a communication unit body that generates the second signal,
a plurality of antennas each located corresponding to the wireless tag included in each of the plurality of toner containers, the plurality of antennas transmitting the second signal to the wireless tag, and
a switching unit that switches an antenna connecting to the communication unit body among the plurality of antennas.

* * * * *